(12) United States Patent
Loeffler et al.

(10) Patent No.: US 7,939,484 B1
(45) Date of Patent: May 10, 2011

(54) METHOD FOR REDUCING THE ADHESION FORCES BETWEEN HARD SURFACES AND SUBSEQUENTLY OCCURRING SOIL

(75) Inventors: Matthias Loeffler, Idstein (DE); Daniel Stephen Rocque, Cornelius, NC (US); George Italo Pitombeira Nunes, Huntersville, NC (US)

(73) Assignee: Clariant International, Ltd., Muttenz (CH)

( * ) Notice: Subject to any disclaimer, the term of this patent is extended or adjusted under 35 U.S.C. 154(b) by 0 days.

(21) Appl. No.: 12/606,446

(22) Filed: Oct. 27, 2009

(51) Int. Cl.
*C11D 3/20* (2006.01)
*C11D 3/26* (2006.01)
*C11D 3/37* (2006.01)

(52) U.S. Cl. ........ 510/238; 510/180; 510/191; 510/235; 510/243; 510/475; 510/495; 510/500; 510/501; 510/505; 134/42

(58) Field of Classification Search .......... 510/180, 510/191, 235, 238, 243, 475, 495, 500, 501, 510/505; 134/42
See application file for complete search history.

(56) References Cited

U.S. PATENT DOCUMENTS

| | | | |
|---|---|---|---|
| 2003/0004241 A1* | 1/2003 | Loffler et al. | 524/173 |
| 2004/0058847 A1* | 3/2004 | Morschhauser et al. | 510/475 |
| 2004/0167055 A1* | 8/2004 | Reinhardt et al. | 510/475 |
| 2005/0003984 A1* | 1/2005 | Himmrich et al. | 510/312 |
| 2005/0165188 A1* | 7/2005 | Loffler et al. | 526/264 |

* cited by examiner

*Primary Examiner* — Gregory R Del Cotto
(74) *Attorney, Agent, or Firm* — Tod A. Waldrop

(57) ABSTRACT

A method for reducing the adhesion forces between hard surfaces and subsequently occurring soil is described. The method comprises the step of treating the hard surfaces with a liquid composition comprising special copolymers A. These copolymers A comprise structural units originating from a1) one or more special monomers comprising a cyclic amide structure or a2) one or more special alkoxylated monomers and b) one or more special monomers comprising an amido group and a sulfonic acid group in protonated or in salt form and may be crosslinked or non-crosslinked.

5 Claims, No Drawings

METHOD FOR REDUCING THE ADHESION FORCES BETWEEN HARD SURFACES AND SUBSEQUENTLY OCCURRING SOIL

The present invention relates to a method for reducing the adhesion forces between hard surfaces and subsequently occurring soil by treating the hard surfaces with a liquid composition comprising special copolymers A.

Usually, liquid washing, cleaning and disinfecting compositions are used to remove soil from already soiled hard surfaces. However, due to adhesion forces between hard surfaces and adhered soil the removal of the soil often is incomplete or requires excessive treatment such as rubbing or scrubbing of the hard surface etc.

Accordingly, it was an objective of the present invention to provide a method to reduce adhesion forces between hard surfaces and subsequently occurring soil.

Surprisingly, it was found that this objective is solved by treating the hard surfaces with a liquid composition comprising special copolymers A.

Therefore, the invention provides a method for reducing the adhesion forces between hard surfaces and subsequently occurring soil characterized in that the method comprises the step of treating the hard surfaces with a liquid composition comprising one or more copolymers A which comprise a1) 1 to 50% by weight of one or more of the repeating structural units of the formula (1)

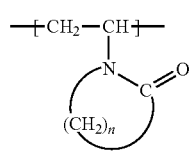

where n is an integer from 2 to 9 or a2) 1 to 50% by weight of one or more of the repeating structural units of the formula (2)

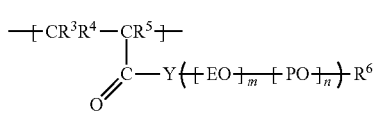

where $R^3$, $R^4$ and $R^5$ are, independently of one another, hydrogen or methyl, $R^6$ is hydrogen or an n-aliphatic, isoaliphatic, olefinic, cycloaliphatic, arylaliphatic or aromatic $(C_1-C_{30})$-hydrocarbon radical, Y is O or NH and m and n are the stoichiometric coefficients relating to the ethylene oxide units (EO) and propylene oxide units (PO) and are, independently of one another, 0 to 50 where the sum of m and n must on average be $\geq 1$ and the distribution of the E0 and PO units over the $-[EO]_m-[PO]_n-$ chain may be random, block-like, alternating or gradient-like, and b) 49.99 to 98.99% by weight of one or more of the repeating structural units of the formula (3)

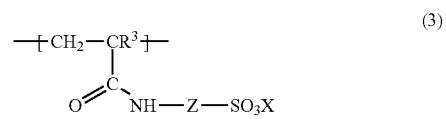

where $R^3$ is hydrogen or methyl,

Z is $(C_1-C_8)$-alkylene and

X is selected from the group consisting of $H^+$, $Li^+$, $Na^+$, $K^+$, $Mg^{++}/2$, $Ca^{++}/2$, $Al^{+++}/3$, $NH_4^+$, monoalkylammonium, dialkylammonium, trialkylammonium and tetraalkylammonium, where the alkyl groups in these ammonium ions comprise, independently of one another, of from 1 to 30 carbon atoms.

The copolymers that are used in the inventive method are called copolymers A. Copolymers A which can be used in the inventive method and their preparation are e.g. described in EP 1 116 733 and EP 1 069 142.

In the one or more repeating structural units of the formula (3) X may be $H^+$. If the copolymers A comprise one or more repeating structural units of the formula (3) wherein X is $H^+$ the neutralization degree of the one or more repeating structural units of the formula (3) preferably is 90% or more. This means that X has a meaning different from $H^+$ in 90 mol-% or more of the one or more repeating structural units of the formula (3). If the copolymers A comprise one or more repeating structural units of the formula (3) wherein X is $H^+$ the neutralization degree of the one or more repeating structural units of the formula (3) particularly preferably is 95% or more and especially preferably 98% or more.

In a further preferred embodiment of the invention all of the counter ions X in the one or more repeating structural units of the formula (3) have a meaning different from $H^+$, i.e. in this preferred embodiment of the invention the neutralization degree of the one or more repeating structural units of the formula (3) is 100%.

In the first step of the inventive method hard surfaces are treated with liquid compositions comprising the copolymers A. Soil that occurs subsequently, i.e. after the first step of the inventive method, adheres less strongly to the hard surface and thus, can be removed easier in the following cleaning steps providing a next time cleaning effect.

Without being bound to this theory it is believed that the copolymers A applied in the first step of the inventive method create a protective layer on the hard surfaces which reduces the adhesion forces between the hard surfaces and the subsequently occurring soil.

The invention furthermore provides a method for reducing the sticking properties of hard surfaces characterized in that the method comprises the step of treating the hard surfaces with a liquid composition comprising one or more copolymers A.

The copolymers A comprise structural units of formulae (1) and (3) or of formulae (2) and (3) and optionally further structural units.

Preferred copolymers A comprise 2 to 30% by weight, with particular preference 3 to 20% by weight, of one or more structural units of formula (1) or (2), preferably of one or more structural units of the formula (1), and 69.5 to 97.5% by weight, with particular preference 84.5 to 96.5% by weight, of one or more structural units of the formula (3).

The copolymers A may either be non-crosslinked or crosslinked.

In a preferred embodiment of the invention the copolymers A are crosslinked. In this case they comprise 0.01 to 8% by weight, with particular preference 0.2 to 3% by weight, with a special preference 0.5 to 2% by weight of one or more crosslinking structures originating from one or more monomers having at least two olefinic double bonds.

The one or more monomers having at least two olefinic double bonds are preferably selected from the group consisting of allyl acrylate, allyl methacrylate, trimethylolpropane triacrylate, trimethylolpropane trimethacrylate, dipropylene glycol diallyl ether, polyglycol diallyl ether, triethylene glycol divinyl ether, hydroquinone diallyl ether, tetraallyloxyethane or other allyl or vinyl ethers, polyfunctional alcohols, tetraethylene glycol diacrylate, triallylamine, trimethylolpropane diallyl ether, methylenebisacrylamide and divinylbenzene.

Particular preference is given to allyl acrylate, allyl methacrylate, trimethylolpropane triacrylate and/or trimethylolpropane trimethacrylate.

In a further preferred embodiment of the invention the copolymers A possess a molecular weight $M_w$ of from $10^3$ to $10^9$ g/mol. Particularly preferably the copolymers A possess a molecular weight $M_w$ of from $10^4$ to $10^7$ g/mol and with especial preference the copolymers A possess a molecular weight $M_w$ of from $5 \cdot 10^4$ to $5 \cdot 10^6$ g/mol. $M_w$ is for the purposes of this invention generally to be determined by GPC (gel permeation chromatography) against polystyrenesulfonic acid.

In a further preferred embodiment of the invention the one or more structural units of the formula (1) originate from substances selected from the group consisting of N-vinylpyrrolidone (NVP) and N-vinylcaprolactam.

In a further preferred embodiment of the invention in the one or more structural units of the formula (2) $R^3$, $R^4$ and $R^5$ are, independently of one another, hydrogen or methyl, $R^6$ is an n-aliphatic, isoaliphatic or olefinic ($C_{10}$-$C_{22}$)-hydrocarbon radical, Y is O or NH, preferably Y is O, n is 0 and m is 1 to 30.

In a further preferred embodiment of the invention in the one or more structural units of the formula (3) $R^3$ is hydrogen or methyl, Z is $C_4$-alkylene and X is selected from the group consisting of $H^+$, $Na^+$ and $NH_4^+$. Particularly preferred copolymers A comprise one or more structural units of the formula (3) wherein $R^3$ is hydrogen, Z is —$C(CH_3)_2$—$CH_2$— and X is $Na^+$.

In a particularly preferred embodiment of the inventive method the one or more copolymers A comprise repeating structural units of the formula (1) wherein n is 3, repeating structural units of the formula (3) wherein $R^3$ is hydrogen —H, Z is —$C_4H_8$—, in particular —$C(CH_3)_2$—$CH_2$—, and X is selected from the group consisting of $H^+$, $Na^+$ and $NH_4^+$ (i.e. these structural units e.g. originate from 2-acrylamido-2-methylpropane sulfonic acid in free or in a respective salt form) and the copolymers A furthermore are cross-linked.

In a further particularly preferred embodiment of the inventive method the one or more copolymers A comprise repeating structural units of the formula (2) wherein $R^3$ and $R^4$ are hydrogen —H, $R^5$ is hydrogen —H or methyl —$CH_3$, Y is O, m is of from 1 to 30, n is 0, and $R^6$ is an n-aliphatic, isoaliphatic or olefinic, preferably an n-aliphatic or olefinic, ($C_{10}$-$C_{22}$)-hydrocarbon radical, repeating structural units of the formula (3) wherein $R^3$ is hydrogen —H, Z is —$C_4H_8$—, in particular —$C(CH_3)_2$—$CH_2$—, and X is selected from the group consisting of $H^+$, $Na^+$ and $NH_4^+$, and the copolymers A furthermore are non cross-linked.

In a further particularly preferred embodiment of the inventive method the one or more copolymers A comprise repeating structural units of the formula (2) wherein $R^3$ and $R^4$ are hydrogen —H, $R^5$ is hydrogen —H or methyl —$CH_3$, Y is O, m is of from 1 to 30, n is 0, and $R^6$ is an n-aliphatic, isoaliphatic or olefinic, preferably an n-aliphatic or olefinic, ($C_{10}$-$C_{22}$)-hydrocarbon radical, repeating structural units of the formula (3) wherein $R^3$ is hydrogen —H, Z is —$C_4H_8$—, in particular —$C(CH_3)_2$—$CH_2$—, and X is selected from the group consisting of $H^+$, $Na^+$ and $NH_4^+$, and the copolymers A furthermore are cross-linked.

The liquid compositions used in the inventive method comprise preferably 0.01 to 10% by weight, with particular preference 0.03 to 5% by weight, with especial preference 0.1 to 2% by weight of copolymers A.

It should be noted that mixtures of two or more of the copolymers A are also in accordance with the invention.

The hard surfaces treated in the inventive method are preferably made of ceramic, metal, glass or plastic.

The liquid compositions used in the inventive method, e.g. washing, cleaning, disinfecting or bleaching compositions, can be in the form of aqueous, aqueous/organic, in particular aqueous/alcoholic and organic formulations. Further embodiments may be emulsions, dispersions, gels or suspensions.

The liquid compositions used in the inventive method are usually adjusted to a pH of from 1 to 12, preferably pH 2 to 8, particularly preferably pH 2 to 6.

The liquid compositions used in the inventive method preferably comprise water. These compositions comprise water preferably in an amount of 65% by weight or more and particularly preferably in an amount of 80% by weight or more.

The copolymers A possess the advantage of being compatible with acidic components and of not losing their effectiveness even in an acidic medium below pH 5. Therefore, in a further preferred embodiment of the inventive method the liquid compositions comprise a pH value of below 5, particularly preferably of from 2 to 5.

Furthermore, the liquid compositions used in the inventive method may comprise bleaching or disinfecting agents, examples being substances which release chlorine or bromine, or organic or inorganic peroxides. These liquid compositions can comprise the bleaching or disinfecting agents in amounts of from 0.1 to 30% by weight, particularly preferably of from 0.5 to 18% by weight and especially preferably of from 1.5 to 9% by weight.

The liquid compositions used in the inventive method, e.g. washing, cleaning, disinfecting or bleaching compositions, can comprise surfactants nonionic, anionic, cationic or amphoteric in nature, and also customary auxiliaries and additives in varying amounts.

Examples for customary auxiliaries and additives are builders, salts, bleaches, bleach activators, optical brighteners, complexing agents, graying inhibitors, solubility promoters, enzymes, thickeners, preservatives, fragrances and dyes, pearlizing agents, foam inhibitors and sequesterants.

The examples below serve to illustrate the invention in more detail without, however, limiting it thereto. All percentages given in these examples are percentages by weight.

EXAMPLE 1

Ceramic tiles have been treated with water ("Control") and with liquid compositions A-J where the pH of the water and of the compositions A-J previously had been adjusted to a pH value of 6 (step A), then have been dried in air at ambient conditions (step B), then have been soiled with a standard soil (step C) and finally have been cleaned with the same formulation that had been used in step A (step D). This procedure is according to ASTM 4488, A5 Soil Test.

The results of the soil removal listed in Table 1 demonstrate the advantages of the inventive method for reducing the adhesion forces between a hard surface and subsequently occurring soil. A high percentage of soil removal corresponds to a high reduction of the adhesion forces between the hard surface and the subsequently occurring soil.

TABLE 1

Results of the soil removal using ceramic tiles treated with
water ("Control") and with liquid compositions A - J

| Ingredient | Amount of the ingredient [% by weight] in "Control" and in the liquid compositions A - J | | | | | | | | | | |
|---|---|---|---|---|---|---|---|---|---|---|---|
| | Control | A | B | C | D | E | F | G | H | I | J |
| Water | 100 | 99.9 | 99.9 | 99.7 | 99.7 | 99.7 | 99.7 | 99.7 | 99.7 | 99.7 | 99.7 |
| Anionic | — | 0.1 | — | 0.1 | — | 0.1 | — | 0.1 | — | 0.1 | — |
| Nonionic | — | — | 0.1 | — | 0.1 | — | 0.1 | — | 0.1 | — | 0.1 |
| Ref. Pol. | — | — | — | — | — | — | — | — | — | 0.2 | 0.2 |
| Polymer 1 | — | — | — | 0.2 | 0.2 | — | — | — | — | — | — |
| Polymer 2 | — | — | — | — | — | 0.2 | 0.2 | — | — | — | — |
| Polymer 3 | — | — | — | — | — | — | — | 0.2 | 0.2 | — | — |
| Soil Removal [% by weight] | 0 | 25.6 | 49.9 | 88.0 | 94.7 | 97.9 | 98.8 | 95.8 | 94.6 | 65.7 | 60.3 |

Ref. Pol.: Reference Polymer
Anionic: sodium dodecyl sulfate
Nonionic: Trideceth-5
Ref. Pol.: Polyacrylate (Mirapol ® Surf-S 110; Rhodia)
Polymer 1: Hostagel ® AV (Ammonium Acryloyldimethyltaurate/VP Copolymer; VP: vinyl pyrrolidone; cross-linked; Clariant)
Polymer 2: copolymer of acryloyldimethyltaurate and Genapol ® T-250 methacrylate; sodium salt; cross-linked; ammonium salt prepared according to EP 1 069 142 - Example 3; exchange of ammonium ions by sodium ions in analogy to WO 2009/098050 - Example 2 Genapol ® T-250 is a ($C_{16}$-$C_{18}$) fatty alcohol polglycol ether with 25 EO (ethylene oxide) units
Polymer 3: copolymer of acryloyldimethytaurate and Genapol ® UD-80 methacrylate; ammonium salt; non cross-linked; prepared according to EP 1 069 142 - Example 2 Genapol ® UD-80 is a $C_{11}$ oxo alcohol polglycol ether with 8 EO (ethylene oxide) units Examples for liquid compositions usable in the inventive method

EXAMPLE A

All-Purpose/Kitchen Cleaner

| Water | 94.8 to 94.55% |
|---|---|
| Cocodimethylaminoxid | 0.10% |
| Ethanol | 2.00% |
| Glycol Ether | 2.50% |
| Sodium Citrate | 0.50% |
| Preservative | 0.05% |
| Fragrance, dye | as needed |
| Polymer 1 | 0.05 to 0.3% |

EXAMPLE B

Bathroom Cleaner

| Water | 92.85 to 92.6% |
|---|---|
| Cocodimethylaminoxid | 0.10% |
| Ethanol | 2.00% |
| Glycol Ether | 2.50% |
| Lactic Acid | 2.50% |
| Fragrance, dye | as needed |
| Polymer 2 | 0.05 to 0.3% |

EXAMPLE C

Cleaner Concentrate

| Water | 86.8 to 84.9% |
|---|---|
| Cocodimethylaminoxid | 11.00% |
| Sodium Citrate | 2.00% |
| Preservative | 0.10% |
| Fragrance, dye | as needed |
| Polymer 3 | 0.1 to 2.00% |

The invention claimed is:

1. A method for reducing the adhesion forces between a hard surface and subsequently occurring soil characterized in that the method comprises the step of treating the hard surface with a liquid composition comprising one or more copolymers A which comprise
   a2) 1 to 50% by weight of one or more of the repeating structural units of the formula (2)

$$-\!\!\!+\!\!CR^3R^4-CR^5\!+\!\!\!- \atop \underset{O}{\overset{\parallel}{C}}-Y-(\!+\!EO\!+\!_m\!+\!PO\!+\!_n)-R^6 \qquad (2)$$

where
R$^3$, R$^4$ and R$^5$ are, independently of one another, hydrogen or methyl,
R$^6$ is hydrogen or an n-aliphatic, isoaliphatic, olefinic, cycloaliphatic, arylaliphatic or aromatic ($C_1$-$C_{30}$)-hydrocarbon radical,
Y is O or NH and
m and n are the stoichiometric coefficients relating to the ethylene oxide units (EO) and propylene oxide units (PO) and are, independently of one another, 0 to 50, where the sum of m and n must on average be $\geq 1$ and the distribution of the EO and PO units over the -[EO]$_m$-[PO]$_n$— chain may be random, block-like, alternating or gradient-like,
and
b) 49.99 to 98.99% by weight of one or more of the repeating structural units of the formula (3)

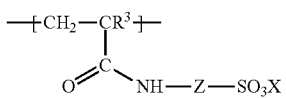 (3)

where
R$^3$ is hydrogen or methyl,
Z is (C$_1$-C$_8$)-alkylene and
X is selected from the group consisting of H$^+$, Li$^+$, Na$^+$, K$^+$, Mg$^{++}$/2, Ca$^{++}$/2, Al$^{+++}$/3, NH$_4^+$, monoalkylammonium, dialkylammonium, trialkylammonium and tetraalkylammonium, where the alkyl groups in these ammonium ions comprise, independently of one another, of from 1 to 30 carbon atoms.

2. A method according to claim 1, where the one or more copolymers A comprise 0.01 to 8% by weight of one or more crosslinking structures originating from one or more monomers having at least two olefinic double bonds.

3. A method according to claim 1, where the copolymers A possess a molecular weight M$_w$ of from 10$^3$ to 10$^9$ g/mol.

4. A method according to claim 1, wherein in the one or more structural units of the formula (2) R$^3$, R$^4$ and R$^5$ are, independently of one another, hydrogen or methyl, R$^6$ is an n-aliphatic, isoaliphatic or olefinic (C$_{10}$-C$_{22}$)-hydrocarbon radical, Y is O or NH, n is 0 and m is 1 to 30.

5. A method according to claim 1, wherein in the one or more structural units of the formula (3) R$^3$ is hydrogen or methyl, Z is C$_4$-alkylene and X is selected from the group consisting of H$^+$, Na$^+$ and NH$_4^+$.

* * * * *